United States Patent [19]
Ito

[11] Patent Number: 5,826,560
[45] Date of Patent: Oct. 27, 1998

[54] ENGINE COMBUSTION CHAMBER AND METHOD OF OPERATION

[75] Inventor: Takeshi Ito, Iwata, Japan

[73] Assignee: Yamaha Hatsudoki Kabushiki Kaisha, Iwata, Japan

[21] Appl. No.: 673,664

[22] Filed: Jun. 25, 1996

[30] Foreign Application Priority Data

Jun. 27, 1995 [JP] Japan .................................... 7-160857

[51] Int. Cl.⁶ ..................................................... F01L 9/02
[52] U.S. Cl. ........................................ 123/315; 123/90.15
[58] Field of Search ................................... 123/315, 432, 123/308, 90.15, 90.17, 90.16

[56] References Cited

U.S. PATENT DOCUMENTS

| | | | |
|---|---|---|---|
| 4,535,732 | 8/1985 | Nakano et al. | 123/432 |
| 4,541,372 | 9/1985 | Weiss | 123/615 |
| 4,587,936 | 5/1986 | Matsuura et al. | 123/432 |
| 4,615,309 | 10/1986 | Yoshikawa | 123/308 |
| 4,779,589 | 10/1988 | Matsuura et al. | 123/315 |
| 4,964,375 | 10/1990 | Takeyama et al. | 123/90.16 |
| 5,072,700 | 12/1991 | Kawamura | 123/315 |
| 5,269,270 | 12/1993 | Suzuki et al. | 123/315 |

FOREIGN PATENT DOCUMENTS 59-99026  6/1984  Japan ...................................... 123/315

*Primary Examiner*—David A. Okonsky
*Attorney, Agent, or Firm*—Knobbe, Martens, Olson & Bear LLP

[57] ABSTRACT

Several embodiments of multi-valve internal combustion engines, wherein low-speed hydrocarbon emissions are reduced by restricting the opening of at least one of the exhaust valves under this running condition. In addition, and in accordance with at least one of the embodiments, one of the intake valves is partially open during a portion of the exhaust cycle to further improve emission control.

11 Claims, 5 Drawing Sheets

ENGINE COMBUSTION CHAMBER AND METHOD OF OPERATION

BACKGROUND OF THE INVENTION

This invention relates to an internal combustion engine and more particularly to an improved combustion chamber configuration and method of operating such engines.

Internal combustion engines are employed for a wide variety of purposes. In many applications, the engine is called upon to run under widely varying speed and load conditions. This is particularly true in connection with vehicle applications wherein the engine is employed to propel a motor vehicle.

These widely varying running conditions present a number of problems in engine design. Many factors in the design of an engine are dependent upon the desired performance at specific load and speed ranges. For example, in engines where high-speed and high-power output is required, the design of many of the components of the engine is quite different from that where the engine operates predominantly at low- or mid-range performance. As a result, when the engine is called upon to operate under widely varying conditions, the running under some of these conditions is less than optimal.

One specific part of the engine design with which this is true is the induction and exhaust system for the engine. Engines that are called upon to produce high-power outputs and operate at high speeds should have free-flowing intake and exhaust systems so that the charge can easily enter and exit the combustion chamber. However, such free-flowing systems can provide less than optimal performance under other than high-speed, high-load conditions.

For example, when a free-breathing engine is operated at low speeds and low loads, hydrocarbon emissions and engine performance can significantly deteriorate. One reason for this is that the free-breathing characteristics of the engine which are important to high-speed, high-load performance cause at least a portion of the intake charge to flow out of the exhaust passages before it can be completely burned under low- and mid-range running operations. If the intake system is designed so as to restrict the intake air flow, then maximum engine performance is sacrificed.

Therefore, there have been proposed various types of split induction systems wherein the induction system functions to provide free and unrestricted flow under high-speed, high-load conditions, but accomplishes another flow pattern under low-speed, low-load conditions. Although these systems are quite effective, they can be somewhat expensive and can substantially increase the complexity of the engine.

It is, therefore, a principal object of this invention to provide an improved engine combustion chamber control system and method for an engine that provides good performance under all running conditions.

It is a further object of this invention to provide an improved engine combustion chamber and control system and method wherein hydrocarbon emissions can be reduced under low-speed, low-load conditions without adversely affecting performance under high-speed, high-load conditions.

It is yet another object of this invention to provide an improved and simplified induction and exhaust system and method for an engine that can permit good performance under all running conditions.

SUMMARY OF THE INVENTION

This invention is adapted to be embodied in an internal combustion engine and method for operating such an engine. The engine has a combustion chamber that is served by an induction system for delivering a charge to the combustion chamber and an exhaust system for discharging a burned charged from the combustion chamber. The exhaust system includes at least two exhaust ports and controlling exhaust valves.

In accordance with an engine constructed in accordance with the invention, the valve operating mechanism for the exhaust valves includes means that restricts the opening of at least one of the exhaust valves under low-speed, low-load conditions so as to restrict the escape of unburned fuel from the exhaust system.

In accordance with a method for practicing the invention, the flow through at least one of the exhaust valves is restricted under low-speed, low-load conditions.

DETAILED DESCRIPTION OF THE PREFERRED EMBODIMENTS OF THE INVENTION

Figure 1:
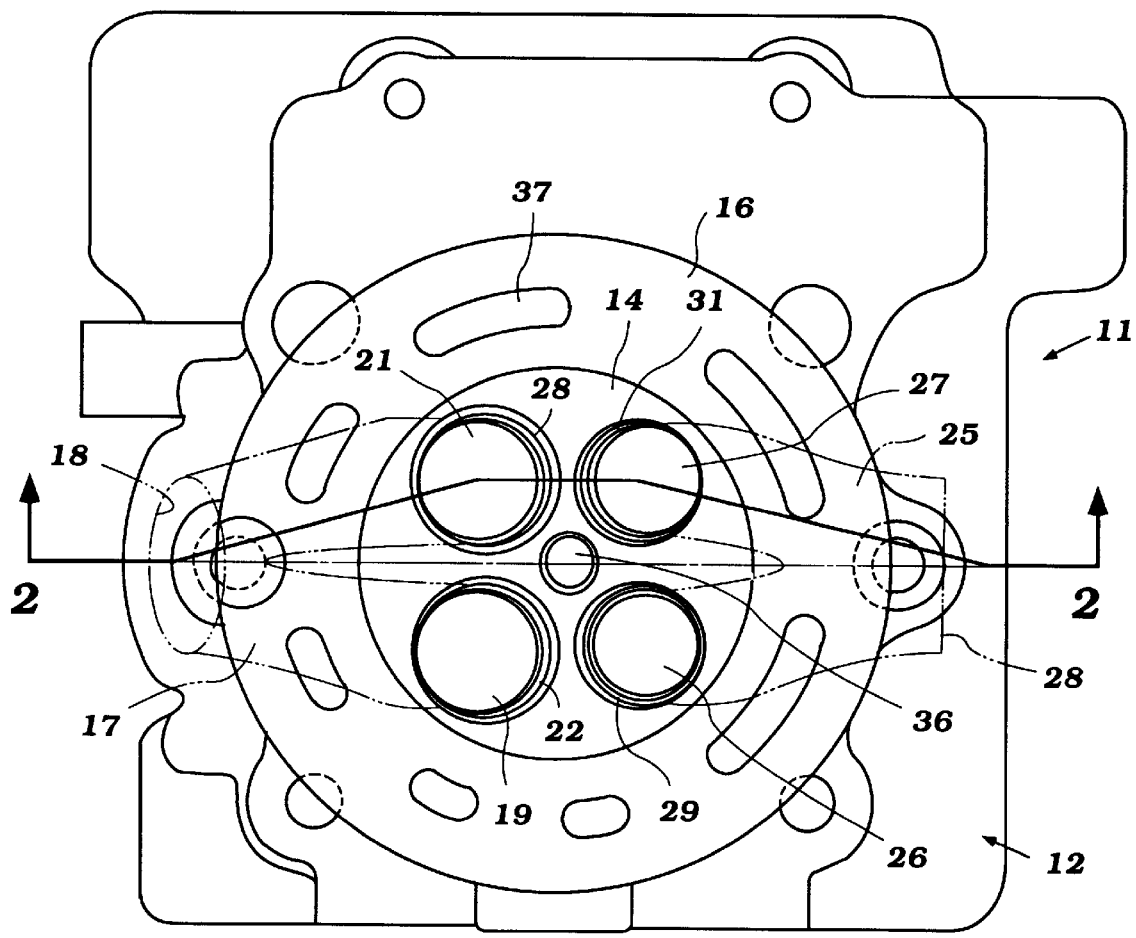
FIG. 1 is a bottom plan view of the combustion chamber of a single cylinder of an internal combustion engine constructed and operated in accordance with an embodiment of the invention and with the intake and exhaust valves removed so as to more clearly show the construction.
Figure 2:
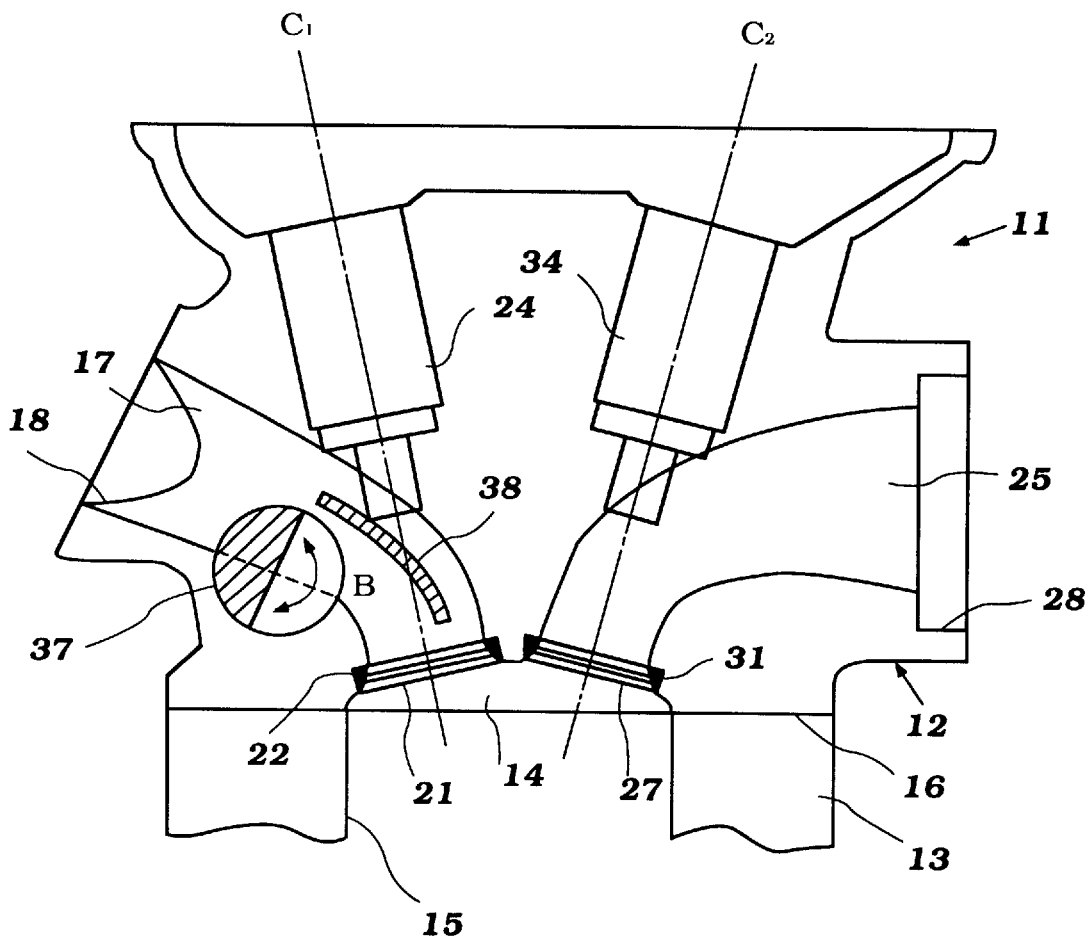
FIG. 2 is a cross-sectional view taken along the line 2—2 of FIG. 1, and again eliminates the showing of the intake and exhaust valves, but illustrates the cooperation of the cylinder head with an associated cylinder block.

Referring now in detail to the drawings and initially to FIGS. 1 and 2, a portion of a single cylinder of an internal combustion engine, indicated generally by the reference numeral 11, is depicted. The drawings illustrate primarily the cylinder head, indicated generally by the reference numeral 12, although FIG. 2 shows the association of this cylinder head 12 with an associated cylinder block 13. The reason for this is that the invention deals primarily with the combustion chamber and particularly the induction and exhaust system which serve the combustion chamber. Therefore, only this portion of the engine is depicted. Also, and for the same reason, only a single cylinder is shown, because those skilled in the art will readily understand how the invention can be practiced in conjunction with multiple-cylinder engines.

The cylinder head 12 is, as noted, associated with an associated cylinder block 13 to which it is affixed in any known manner. The cylinder head 12 is provided with a combustion chamber recess 14 which cooperates with a cylinder bore 15 of the cylinder block 13 to form with it and with a piston (not shown) that reciprocates in the cylinder bore, a combustion chamber. The cylinder head 12 has a peripheral sealing surface 16 which surrounds the combustion chamber recess 14 and which is held in sealing relationship with the cylinder block 13. A cylinder head gasket (not shown) may be interposed between the cylinder head surface 16 and the cylinder block 13, as is well known in this art.

An intake passage arrangement, indicated by the reference numeral 17, extends from an inlet opening 18 in the outer surface of one side of the cylinder head 12. This intake passage 17 is in the illustrated embodiment of the Siamese-type and branches into a pair of intake ports 19 and 21 which open into the combustion chamber recess 14. Intake valve seats 22 and 23 are appropriately positioned at the ends of the intake ports 19 and 21 so as to provide a seating area for a respective poppet-type intake valve (not shown).

Figure 3:
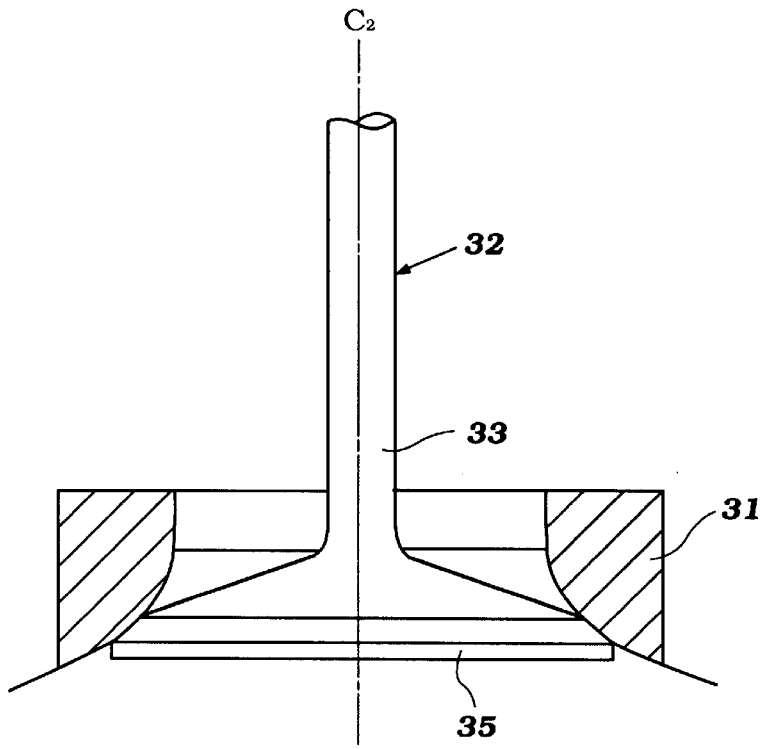
FIG. 3 is an enlarged cross-sectional view taken through one of the exhaust valves of the engine.

The poppet type intake valves have their stem portions slidably supported in valve guides 24 that are formed in the cylinder head 12. Although the configuration of the intake valves is not shown, they are basically the same as the exhaust valves, one of which will be described later by particular reference to FIG. 3.

An intake air charge is delivered to the cylinder head intake passage 17 by any suitable form of induction system, and since any conventional arrangement may be employed, the remainder of the induction system has not been illustrated. In addition, a fuel charge may be mixed with this intake air by a suitable charge-former, such as a fuel injector or carburetor. Again, however, since any conventional charge-forming system may be utilized in conjunction with the invention, this arrangement has not been illustrated.

The intake valves are operated by a suitable valve operating mechanism, which may comprise an overhead-mounted camshaft, which is also not shown and which can operate the intake valves directly through thimble tappets. The intake valves are mounted so that their reciprocal axes $C_1$ that lies in a common plane that is disposed at an acute angle to the axis of the cylinder bore 15.

On the side of the cylinder head 12 opposite the intake passage 17, a Siamese-type exhaust passage 25 is provided. This exhaust passage 25 extends from a pair of exhaust ports 26 and 27 to a common discharge opening 28 formed in an outer surface of the cylinder head 12 and opposite to the intake passage opening 18. Exhaust valve seats 29 and 31 are formed in the cylinder head at the base or opening of the intake ports 26 and 27. As may be seen in FIG. 3, poppet-type intake valves, indicated generally by the reference numeral 32, are slidably supported in the cylinder head and cooperate with the valve seats 29 and 31. To this end, each poppet-type exhaust valve 32 has a stem portion 33 that is slidably supported in a valve guide 34 in the cylinder head 12. These valves have head portions 35 that cooperate with the valve seat 31 for controlling the flow through the exhaust passage 25.

Like the intake valves, the exhaust valves 32 may be operated by any known type of mechanism. As will become apparent, however, the operating mechanism for the valves preferably includes an arrangement wherein the lift or opening of one or more of the exhaust valves 32 may be controlled and, in accordance with a later described embodiment, also the lift of one or more of the intake valves can be controlled. The purpose for this will be described shortly.

The exhaust valves 32 are supported for reciprocation within the cylinder head so that their reciprocal axes lie in a common plane $C_2$ that is also disposed at an acute angle to the plane containing the axis of the cylinder bore 15.

Preferably, this acute angle is greater than the acute angle of the plane containing the intake valve axes $C_1$.

The cylinder head 12 is provided with a spark plug receiving recess 36 which is disposed substantially on the cylinder bore axis in which a spark plug is contained for firing the charge in the combustion chambers 14.

Also, the engine 11 is water cooled, and both the cylinder block 13 and cylinder head 12 are formed with cooling jackets. These cooling jackets communicate with each other through water flow ports 37 formed in the cylinder head seating surface 16 and corresponding openings formed in the cylinder block 13, as is well known in this art.

In order to improve the performance of the engine 11, particularly under low- and mid-range running conditions, a tumble valve 37 may be mounted in the cylinder head 12 and extending transversely across the intake passage 17. The tumble valve 37 is rotatable between a closed position, as shown in FIG. 2, and an open position through the arc B, as indicated in FIG. 2. In the closed position as shown, the intake charge flowing into the combustion chamber 14 through the intake ports 19 and 21, is redirected toward the center of the cylinder bore 15 so as to generate a tumble action in the combustion chamber. A rectifier plate 38 may be positioned in the intake passage 17 so as to assist in this flow redirection. This introduces a turbulence in the combustion chamber which improves flame propagation under low-speed and mid-range running conditions. Under high-speed running conditions, the tumble valve 37 is opened, and a substantially unrestricted induction results so as to improve induction efficiency and combustion under all running conditions.

Figure 4:
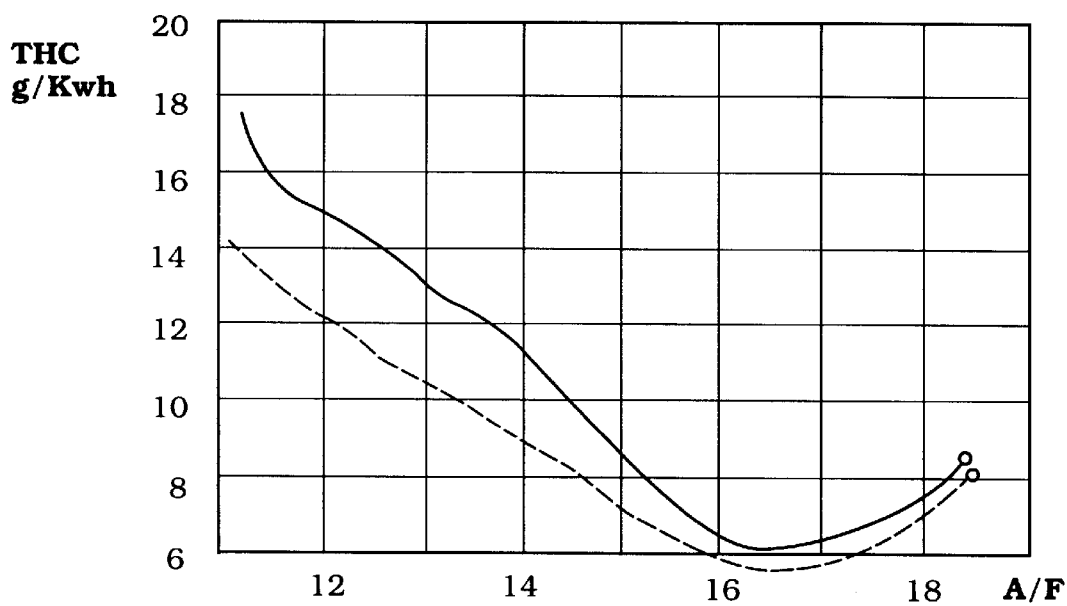
FIG. 4 is a graphical view showing how the total hydrocarbons (THC) in the exhaust vary with air-fuel ratio.

In spite of the high efficiency of the induction system under high-speed, high-load conditions, and the added turbulence under low-speed, low-load conditions that improves combustion, as noted, there still is a problem in conjunction with relatively high hydrocarbon emissions when operating under low-speed, low-load conditions. This may be understood by reference to FIG. 4, which is graphical view that shows total hydrocarbons (THC) in relation to variations in air-fuel ratio. Of course, stoichiometric gives the best performance, but there are still problems with high emissions, particularly when the ratio varies from stoichiometric.

Part of the reason for the high hydrocarbon emissions is that the exhaust system is also very efficient, and as a result, under low-speed, low-load conditions, some of the fuel charge may pass out of the combustion chamber before it has had an opportunity to burn, even if combustion speed is accelerated due to the turbulence generated by the tumble valve 37. Therefore, in accordance with an important feature of the invention, the valve timing mechanism and valve actuating mechanism is constructed so that at least one of the exhaust valves 32 is not opened under low-speed, low-load conditions. This has the effect of restricting the exhaust flow sufficiently so as to reduce hydrocarbons emissions, as shown by the broken line curve in FIG. 4. As a result, the emissions of the engine can be reduced without adversely affecting its other performance, and without restricting performance under high-speed, high-load conditions.

As has been noted, any known type of system may be employed for precluding or restricting the opening of one of the exhaust valves 32 under this condition. For example, a mechanism of the type shown in the copending application entitled "Valve Actuating Structure For Multi-Valve Engine", Ser. No. 08/521,055, filed Aug. 29, 1995, in the names of Hiroyuki Tsuzuku et al, and assigned to the assignee hereof, may be employed for this purpose.

Figure 6:
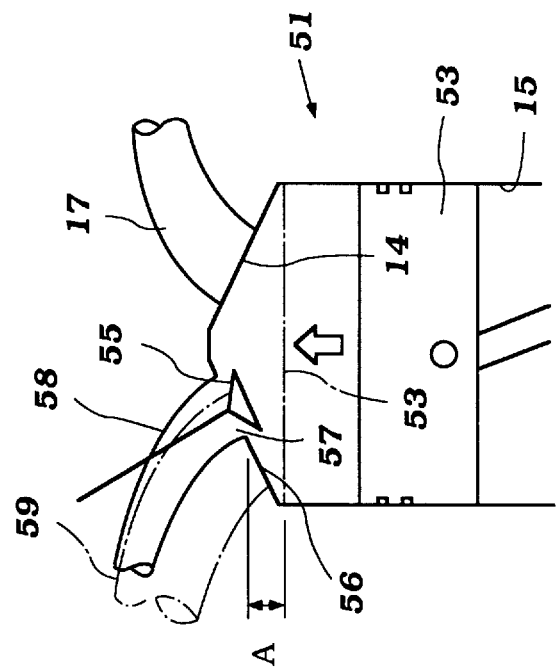
FIG. 6 is a cross-sectional view, in part similar to FIG. 2, but shows the construction of the embodiment of FIG. 5.
Figure 5:
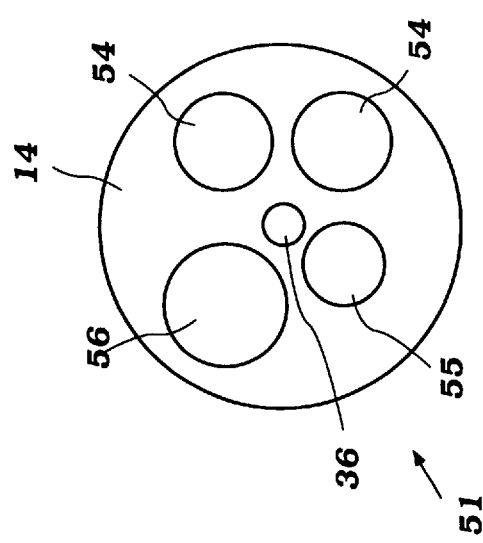
FIG. 5 is a partially schematic bottom plan view, in part similar to FIG. 1, and shows another embodiment of the invention.

An engine constructed and operated in accordance with another embodiment of the invention is identified generally by the reference numeral 51, and is shown in somewhat more schematic form in FIGS. 5 and 6. In this embodiment, the piston associated with the cylinder bore 15 is shown and is identified by the reference numeral 53. In this embodiment, the intake valves are shown and identified by the reference numeral 54, and their position in the cylinder head is reversed from that shown in the previously described embodiment, but the construction is substantially the same as that previously described, including the possibility of utilizing a tumble valve. Where components in this embodiment are the same as those previously described, the same reference numerals have been utilized to identify like components.

In this embodiment, there is provided a first exhaust valve 55 which is disposed closer to the cylinder bore axis and which is of smaller diameter than a second exhaust valve 56 that is disposed further from the cylinder bore axis. It is the larger exhaust valve 56 which is controlled in this embodiment so that it does not open and close under low-speed, low-load conditions. The small exhaust valve 55 cooperates with a valve seat 57 in an exhaust passage 58, and opens and closes at all times during engine operation. The larger exhaust valve 56 is operated by a variable lift mechanism and is held closed or substantially closed under low-speed, low-load conditions so that flow through its associated exhaust passage 59 will be precluded.

It should be seen that the exhaust valve seat 58 is disposed at a height A above the top dead center position of the piston 53, as shown in the dotted line position of FIG. 6, so as to permit good valve lift for the exhaust valve. As a result, the exhaust gases can flow out of the engine very efficiently, but excess flow is not permitted under low-speed, low-load conditions, as would result in the discharge of unburned fuel resulting in high total hydrocarbon emissions.

Figure 7:
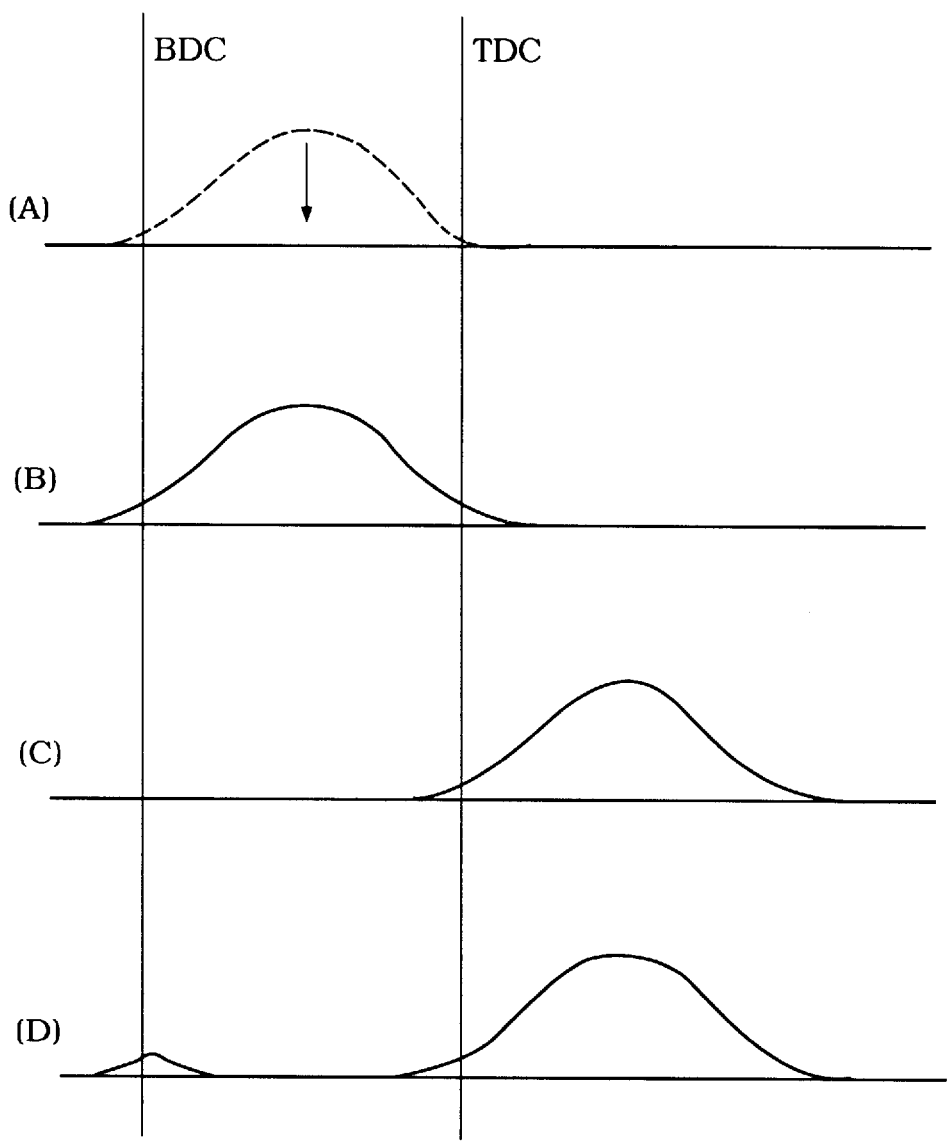
FIG. 7 is a graphical view showing the lift conditions of the exhaust and intake valves during the low-speed, low-load operation in accordance with a further embodiment of the invention.

FIG. 7 is a timing diagram which shows in the curve A the controlled lift of the one exhaust valve, this being the exhaust valve 56 of the embodiment of FIGS. 5 and 6, or one of the exhaust valves 32 of the embodiment of FIGS. 1–4. As may be seen, under low-speed, low-load conditions, there is no lift for this valve, while the remaining exhaust valves shown by the curve B as its normal lift.

This figure also indicates another way in which performance can be improved, and this is by opening one of the intake valves, shown by the curve D, during the beginning of the exhaust stroke. When this is done, a portion of the charge will be delivered back into the intake system of this intake passage so as to provide, in effect, an internal EGR operation. This has been found to assist not only in control of hydrocarbon emissions, but also No$_x$ emissions.

Thus, from the foregoing description, it should be readily apparent that the described embodiments of the invention provide good performance under all running conditions. In addition, hydrocarbon emissions are controlled by restricting the exhaust flow under low-speed, low-load conditions in such a manner that high-speed performance is not sacrificed, Of course, the foregoing description is that of preferred embodiments of the invention, and various changes and modifications may be made without departing from the spirit and scope of the invention, as defined by the appended claims.

What is claimed is:

1. An internal combustion engine having a combustion chamber, an intake passage arrangement for supplying an intake charge to said combustion chamber including at least one intake valve an exhaust passage arrangement for discharging an exhaust charge from said combustion chamber, said exhaust passage arrangement being comprised of at least two exhaust ports and exhaust valves for controlling the flow through said exhaust ports, operating means for operating said intake and said exhaust valves, and means embodied in said operating means for restricting the opening of one of said exhaust valves under low-speed, low-load conditions and for opening said intake valve during the opening of at least one of said exhaust valves.

2. The internal combustion engine of claim 1, wherein the opening of the one exhaust valve is totally precluded under low-speed, low-load conditions.

3. The internal combustion engine of claim 1, wherein there are two intake valves for controlling the flow of the intake charge through the induction system to the combustion chamber, and only one of said intake valves is opened during the time when the operated exhaust valve is opened.

4. The internal combustion engine of claim 3, wherein the exhaust valves are disposed at different distances from the axis of the combustion chamber.

5. The internal combustion engine of claim 4, wherein the opening of the furthest exhaust valve from the axis of the combustion chamber is restricted.

6. The internal combustion engine of claim 3, wherein the exhaust ports and exhaust valves have different diameters.

7. The internal combustion engine of claim 6, wherein the exhaust valve with the largest diameter is held in its closed position under the low-speed, low-load conditions.

8. The internal combustion engine of claim 1, wherein the smaller exhaust valve is disposed closer to the axis of the combustion chamber.

9. An internal combustion engine having a combustion chamber, an intake passage arrangement for supplying an intake charge to said combustion chamber, an exhaust passage arrangement for discharging an exhaust charge from said combustion chamber, said exhaust passage arrangement being comprised of at least two exhaust ports and exhaust valves for controlling the flow through said exhaust ports, means for operating said exhaust valves, and means embodied in said operating means for said exhaust valves for restricting the opening of one of said exhaust valves under low-speed, low-load conditions, said exhaust ports and exhaust valves have different diameters and are disposed at different distances from the axis of the combustion chamber and the exhaust valve furthest from said combustion chamber axis is the one that is restricted.

10. The internal combustion engine of claim 9, wherein the restricted exhaust valve is held in its closed position under the low-speed, low-load conditions.

11. The internal combustion engine of claim 9, wherein the smaller exhaust valve is disposed closer to the axis of the combustion chamber.

* * * * *